(12) United States Patent
Clark et al.

(10) Patent No.: US 9,481,749 B1
(45) Date of Patent: Nov. 1, 2016

(54) PROCESSES FOR PREPARING METALLOCENE-BASED CATALYST SYSTEMS IN CYCLOHEXENE

(71) Applicant: Chevron Phillips Chemical Company LP, The Woodlands, TX (US)

(72) Inventors: Kensha Marie Clark, Tulsa, OK (US); Qing Yang, Bartlesville, OK (US); Gary L. Glass, Dewey, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/751,226

(22) Filed: Jun. 26, 2015

(51) Int. Cl.
*C08F 4/6592* (2006.01)
*C08F 210/16* (2006.01)
*C08F 4/659* (2006.01)

(52) U.S. Cl.
CPC ........... *C08F 210/16* (2013.01); *C08F 4/6592* (2013.01); *C08F 4/65912* (2013.01); *C08F 4/65916* (2013.01)

(58) Field of Classification Search
CPC .............. B01J 31/2265; C08F 4/6592; C08F 4/65912; C08F 4/65916; C08F 210/16
See application file for complete search history.

(56) References Cited

U.S. PATENT DOCUMENTS

| | | | |
|---|---|---|---|
| 3,248,179 A | 4/1966 | Norwood | |
| 4,501,885 A | 2/1985 | Sherk et al. | |
| 4,588,790 A | 5/1986 | Jenking, III et al. | |
| 5,352,749 A | 10/1994 | DeChellis et al. | |
| 5,436,304 A | 7/1995 | Griffin et al. | |
| 5,565,175 A | 10/1996 | Hottovy et al. | |
| 5,575,979 A | 11/1996 | Hanson | |
| 6,107,230 A | 8/2000 | McDaniel et al. | |
| 6,165,929 A | 12/2000 | McDaniel et al. | |
| 6,239,235 B1 | 5/2001 | Hottovy et al. | |
| 6,262,191 B1 | 7/2001 | Hottovy et al. | |
| 6,294,494 B1 | 9/2001 | McDaniel et al. | |
| 6,300,271 B1 | 10/2001 | McDaniel et al. | |
| 6,316,553 B1 | 11/2001 | McDaniel et al. | |
| 6,355,594 B1 | 3/2002 | McDaniel et al. | |
| 6,376,415 B1 | 4/2002 | McDaniel et al. | |
| 6,388,017 B1 | 5/2002 | McDaniel et al. | |
| 6,391,816 B1 | 5/2002 | McDaniel et al. | |
| 6,395,666 B1 | 5/2002 | McDaniel et al. | |
| 6,458,904 B1 | 10/2002 | Gonioukh et al. | |
| 6,524,987 B1 | 2/2003 | Collins et al. | |
| 6,548,441 B1 | 4/2003 | McDaniel et al. | |
| 6,548,442 B1 | 4/2003 | McDaniel et al. | |
| 6,576,583 B1 | 6/2003 | McDaniel et al. | |
| 6,613,712 B1 | 9/2003 | McDaniel et al. | |
| 6,632,894 B1 | 10/2003 | McDaniel et al. | |
| 6,667,274 B1 | 12/2003 | Hawley et al. | |
| 6,750,302 B1 | 6/2004 | McDaniel et al. | |
| 6,833,415 B2 | 12/2004 | Kendrick et al. | |
| 7,026,494 B1 | 4/2006 | Yang et al. | |
| 7,041,617 B2 | 5/2006 | Jensen et al. | |
| 7,199,073 B2 | 4/2007 | Martin | |
| 7,226,886 B2 | 6/2007 | Jayaratne et al. | |
| 7,294,599 B2 | 11/2007 | Jensen et al. | |
| 7,312,283 B2 | 12/2007 | Martin et al. | |
| 7,517,939 B2 | 4/2009 | Yang et al. | |
| 7,531,606 B2 | 5/2009 | Hendrickson | |
| 7,598,327 B2 | 10/2009 | Shaw | |
| 7,601,665 B2 | 10/2009 | McDaniel et al. | |
| 7,619,047 B2 | 11/2009 | Yang et al. | |
| 7,884,163 B2 | 2/2011 | McDaniel et al. | |
| 7,919,639 B2 | 4/2011 | Murray et al. | |
| 8,080,681 B2 | 12/2011 | Murray et al. | |
| 8,309,485 B2 | 11/2012 | Yang et al. | |
| 8,822,608 B1 | 9/2014 | Bhandarkar et al. | |
| 9,163,098 B2 | 10/2015 | McDaniel et al. | |
| 9,303,106 B1 | 4/2016 | Clark et al. | |
| 2010/0160579 A1* | 6/2010 | Yang .................... | C08F 210/16 526/95 |

OTHER PUBLICATIONS

*Moderon Plastics Encyclopedia*, Mid-Nov. 1995 Issue, vol. 72, No. 12, 3 pages.
*Film Extrusion Manual—Process, Materials, Properties*, TAPPI Press, 1992, 16 pages.
International Search Report of the International Searching Authority in PCT/US2016/038544 dated Sep. 8, 2016, 5 pages.

* cited by examiner

*Primary Examiner* — Caixia Lu

(74) *Attorney, Agent, or Firm* — Merchant & Gould P.C.

(57) ABSTRACT

Methods for preparing metallocene-based catalyst systems containing an activator-support are disclosed. These methods are directed to contacting an activator-support, an organoaluminum compound, and a mixture containing a metallocene compound and cyclohexene or a mixture of cyclohexane and 1-hexene, resulting in catalyst systems with increased catalytic activity for the polymerization of olefins.

13 Claims, No Drawings

PROCESSES FOR PREPARING METALLOCENE-BASED CATALYST SYSTEMS IN CYCLOHEXENE

FIELD OF THE INVENTION

The present disclosure concerns metallocene catalyst systems, and more particularly relates to homogeneous solutions containing a metallocene component and cyclohexene, useful in preparing olefin-based polymers.

BACKGROUND OF THE INVENTION

There are various methods used to prepare metallocene-based catalyst systems containing an activator-support. These catalyst systems can be used to polymerize olefins to produce olefin-based polymers, such as ethylene/α-olefin copolymers. For the same initial components of the catalyst system, it would be beneficial for these catalyst systems to have higher catalyst activities and to produce polymers having less residual solvents, as a result of the method used to prepare the catalyst system. Accordingly, it is to these ends that the present disclosure is directed.

SUMMARY OF THE INVENTION

The present invention generally relates to new catalyst compositions, methods for preparing catalyst compositions, methods for using the catalyst compositions to polymerize olefins, the polymer resins produced using such catalyst compositions, and articles produced using these polymer resins. In particular, the present invention relates to methods for preparing metallocene-based catalyst compositions, and to the resultant catalyst compositions. Catalyst compositions of the present invention can be used to produce, for example, ethylene-based homopolymers and copolymers.

Various processes and methods related to the preparation of metallocene-based catalyst compositions are disclosed herein. In one embodiment, a process for producing a catalyst composition is provided herein, and in this embodiment, the process can comprise contacting, in any order, (a) an activator-support, (b) a mixture comprising cyclohexene and a metallocene compound, and (c) an organoaluminum compound, to produce the catalyst composition. In a further embodiment, the mixture can comprise cyclohexene, 1-hexene, and the metallocene compound. In another embodiment, a process for producing a catalyst composition is provided, and in this embodiment, the process can comprise (i) contacting an activator-support and an organoaluminum compound for a first period of time to form a precontacted mixture, and (ii) contacting the precontacted mixture with a second mixture comprising cyclohexene and a metallocene compound for a second period of time to form the catalyst composition. In a further embodiment, the second mixture can comprise cyclohexene, 1-hexene, and the metallocene compound. While not wishing to be bound by the following theory, it is believed that the metallocene-based catalyst compositions, prepared as described herein, may have unexpected increases in catalyst activity, or improved solubility of the metallocene compound, or both. Moreover, polymers produced using the metallocene-based catalyst compositions, prepared as described herein, may have lower levels of residual solvents.

Catalyst compositions also are encompassed by the present invention. In one embodiment, the catalyst composition can comprise (A) an activator-support, (B) an organoaluminum compound, (C) a metallocene compound, and (D) cyclohexene (and optionally, 1-hexene). In another embodiment, the catalyst composition can comprise (I) a precontacted mixture comprising an activator-support and an organoaluminum compound, (II) a metallocene compound, and (III) cyclohexene (and optionally, 1-hexene).

The present invention also contemplates and encompasses olefin polymerization processes. Such processes can comprise contacting a catalyst composition with an olefin monomer and optionally an olefin comonomer in a polymerization reactor system under polymerization conditions to produce an olefin polymer. Generally, the catalyst composition employed can comprise any of the metallocene-based catalyst systems disclosed herein, for instance, any of the metallocene compounds, any of activator-supports, and any of the organoaluminum compounds disclosed herein.

Polymers produced from the polymerization of olefins, resulting in homopolymers, copolymers, or terpolymers, can be used to produce various articles of manufacture.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are often described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "an activator-support" and "a metallocene compound" is meant to encompass one, or mixtures or combinations of more than one, activator-support and metallocene compound, respectively, unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. A general reference to pentane, for example, includes n-pentane, 2-methyl-butane, and 2,2-dimethylpropane; and a general reference to a butyl group includes a n-butyl group, a sec-butyl group, an iso-butyl group, and a t-butyl group.

Also, unless otherwise specified, any carbon-containing group or compound for which the number of carbon atoms is not specified can have 1, 2, 3, 4, 5, 6, 7, 8, 9, 10, 11, 12, 13, 14, 15, 16, 17, 18, 19, or 20 carbon atoms, or any range or combination of ranges between these values. For example, unless otherwise specified, any carbon-containing group or compound can have from 1 to 20 carbon atoms, from 1 to 18 carbon atoms, from 1 to 12 carbon atoms, from 1 to 8 carbon atoms, from 2 to 20 carbon atoms, from 2 to 12 carbon atoms, from 2 to 8 carbon atoms, or from 2 to 6 carbon atoms, and the like. Moreover, other identifiers or qualifying terms can be utilized to indicate the presence of, or absence of, a particular substituent, a particular regiochemistry, and/or stereochemistry, or the presence or absence of a branched underlying structure or backbone. Any specific carbon-containing group is limited according to the chemical and structural requirements for that specific group, as understood by one of ordinary skill in the art.

Other numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present disclosure sets forth that a weight ratio of a first metallocene compound to a second metallocene compound can be in a range from about 1:10 to about 10:1 in certain embodiments. By a disclosure that the weight ratio can be in a range from about 1:10 to about 10:1, the intent is to recite that the weight ratio can be any weight ratio within the range and, for example, can be equal to about 1:10, about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1, about 9:1, or about 10:1. Additionally, the weight ratio can be within any range from about 1:10 to about 10:1 (for example, the weight ratio can be in a range from about 1:2 to about 2:1), and this also includes any combination of ranges between about 1:10 and 10:1. Likewise, all other ranges disclosed herein should be interpreted in a manner similar to these examples.

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers and terpolymers derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also is meant to include all molecular weight polymers, and is inclusive of lower molecular weight polymers or oligomers. The term "polymer" as used herein is intended to encompass oligomers derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, and terpolymerization, as well as processes that might also be referred to as oligomerization processes. Therefore, a copolymerization process can involve contacting an olefin monomer (e.g., ethylene) and an olefin comonomer (e.g., 1-hexene) to produce an olefin copolymer.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the organoaluminum compound, the metallocene compound, or the activator-support, after combining these components. Therefore, the terms "catalyst composition," "catalyst mixture," "catalyst system," and the like, can encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The terms "contact product," "contacting," and the like, are used herein to describe methods and compositions wherein the components are combined or contacted together in any order, in any manner, and for any length of time, unless otherwise specified. For example, the components can be contacted by blending or mixing. Further, unless otherwise specified, the contacting of any component can occur in the presence or absence of any other component of the methods and compositions described herein. Combining additional materials or components can be done by any suitable method. These terms encompass mixtures, blends, solutions, slurries, reaction products, and the like, as well as combinations thereof.

A "precontacted mixture" describes a mixture of catalyst components that are combined or contacted for a period of time prior to being contacted with other catalyst components. According to this description, it is possible for the components of the precontacted mixture, once contacted, to have reacted to form at least one chemical compound, formulation, species, or structure different from the distinct initial compounds or components used to prepare the precontacted mixture.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

Disclosed herein are methods for preparing metallocene-based catalyst compositions using cyclohexene, 1-hexene, or mixtures of cyclohexene and 1-hexene. Polymerization processes utilizing these catalyst compositions also are disclosed. A potential benefit of the methods and catalyst compositions disclosed herein, which utilize cyclohexene alone or in combination with 1-hexene instead of toluene alone or in combination with 1-hexene, is an unexpected increase in catalyst activity. Another potential and unexpected benefit is improved solubility and less precipitation of the metallocene compound. Yet another potential and unexpected benefit is the lower level of residual solvents present in polymers produced using the catalyst compositions and polymerization processes disclosed herein. Additionally, the reduction and/or elimination of residual toluene in the produced polymer is another potential benefit, since recent regulations indicate that toluene can have a number of hazards associated with its use. Other potential benefits of the compositions and methods disclosed herein are readily apparent to those of skill in the art.

Methods for Preparing Catalyst Compositions

Various processes for preparing a catalyst composition containing a metallocene compound, an activator-support, and an organoaluminum compound are disclosed and described. One or more than one metallocene compound, activator-support, and organoaluminum compound can be employed in the disclosed processes and compositions. A process for producing a catalyst composition consistent with embodiments of this invention can comprise (or consist essentially of, or consist of):

(i) contacting an activator-support and an organoaluminum compound for a first period of time to form a precontacted mixture (alternatively, and equivalently, a first mixture); and (ii) contacting the precontacted mixture with a second mixture comprising cyclohexene and a metallocene compound for a second period of time to form the catalyst composition.

Generally, the features of any of the processes disclosed herein (e.g., the activator-support, the organoaluminum compound, the metallocene compound, the first period of time, the second period of time, among others) are independently described herein, and these features can be combined in any combination to further describe the disclosed processes. Moreover, other process steps can be conducted before, during, and/or after any of the steps listed in the disclosed processes, unless stated otherwise. Additionally, catalyst compositions produced in accordance with the disclosed processes are within the scope of this disclosure and are encompassed herein.

In some embodiments, the second mixture can comprise cyclohexene, 1-hexene, and the metallocene compound. Typically, in these embodiments, the weight ratio (wt. %:wt. %) of 1-hexene to cyclohexene (1-hexene:cyclohexene) in the second mixture can fall within a range from about 99:1 to about 1:99, from about 95:5 to about 10:90, from about 90:10 to about 20:80, from about 90:10 to about 50:50, from about 90:10 to about 60:40, from about 85:15 to about 25:75, from about 85:15 to about 60:40, or from about 85:15 to about 70:30, and the like. Other appropriate ranges for the weight ratio of 1-hexene:cyclohexene in the second mixture are readily apparent from this disclosure.

Step (i) of the process often can be referred to as the precontacting step, and in the precontacting step, an activator-support can be combined with an organoaluminum compound for a first period of time to form a precontacted mixture. The precontacting step can be conducted at a variety of temperatures and time periods. For instance, the precontacting step can be conducted at a precontacting temperature in a range from about 0° C. to about 100° C.; alternatively, from about 0° C. to about 75° C.; alternatively, from about 10° C. to about 75° C.; alternatively, from about 20° C. to about 60° C.; alternatively, from about 20° C. to about 50° C.; alternatively, from about 15° C. to about 45° C.; or alternatively, from about 20° C. to about 40° C. In these and other embodiments, these temperature ranges also are meant to encompass circumstances where the precontacting step is conducted at a series of different temperatures, instead of at a single fixed temperature, falling within the respective ranges.

The duration of the precontacting step (the first period of time) is not limited to any particular period of time. Hence, the first period of time can be, for example, in a time period ranging from as little as 1-10 seconds to as long as 48 hours, or more. The appropriate first period of time can depend upon, for example, the precontacting temperature, the amounts of the activator-support and the organoaluminum compound in the precontacted mixture, the presence of diluents or solvents in the precontacting step, and the degree of mixing, among other variables. Generally, however, the first period of time can be at least about 5 sec, at least about 10 sec, at least about 30 sec, at least about 1 min, at least about 5 min, at least about 10 min, and so forth. Typical ranges for the first period of time can include, but are not limited to, from about 1 sec to about 48 hr, from about 10 sec to about 48 hr, from about 30 sec to about 24 hr, from about 30 sec to about 6 hr, from about 1 min to about 12 hr, from about 5 min to about 24 hr, or from about 10 min to about 8 hr, as well as ranges within these exemplary ranges.

Often, the precontacting step can be conducted by combining a slurry of the activator-support in a first diluent with a solution of the organoaluminum compound in the same or a different diluent, and mixing to ensure sufficient contacting of the activator-support and the organoaluminum compound. However, any suitable procedure known to those of skill in the art for thoroughly combining the activator-support and the organoaluminum compound can be employed. Non-limiting examples of suitable hydrocarbon diluents can include, but are not limited to, propane, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, and the like, or combinations thereof. In some embodiments, the first diluent can comprise cyclohexene or 1-hexene, or a mixture of cyclohexene and 1-hexene. In another embodiment, the activator-support can be present as a dry solid, and the precontacting step can be conducted by combining the dry activator-support with a solution of the organoaluminum compound in a first diluent (e.g., a suitable hydrocarbon solvent, such as cyclohexane, isobutane, n-butane, n-pentane, isopentane, neopentane, hexane, heptane, and the like, as well as combinations thereof), and mixing to ensure sufficient contacting of the activator-support and the organoaluminum compound. Accordingly, any suitable procedure known to those of skill in the art for contacting or combining the activator-support and the organoaluminum compound can be employed.

In step (ii) of the process, the precontacted mixture (often, a slurry) can be contacted with the second mixture containing one or more metallocene compounds and cyclohexene (and 1-hexene, if used) to form the catalyst composition. Step (ii), likewise, can be conducted at a variety of temperatures and time periods. For instance, step (ii) can be conducted at a temperature in a range from about 0° C. to about 100° C.; alternatively, from about 10° C. to about 75° C.; alternatively, from about 20° C. to about 60° C.; alternatively, from about 15° C. to about 45° C.; or alternatively, from about 20° C. to about 40° C. In these and other embodiments, these temperature ranges are also meant to encompass circumstances where step (ii) is conducted at a series of different temperatures, instead of at a single fixed temperature, falling within the respective ranges. As an example, the precontacted mixture and the second mixture can be contacted at an elevated temperature, following by cooling to a lower temperature for longer term storage of the finished catalyst composition.

The second period of time is not limited to any particular period of time. Hence, the second period of time can range from as little as 1-10 seconds to as long as 48 hours, or more. The appropriate second period of time can depend upon, for example, the temperature, the amounts of the precontacted mixture and the second mixture, the presence of diluents or solvents in step (ii), the degree of mixing, and considerations for long term storage, among other variables. Generally, however, the second period of time can be at least about 5 sec, at least about 10 sec, at least about 30 sec, at least about 1 min, at least about 5 min, at least about 10 min, and so forth. Assuming the catalyst composition is not intended for long term storage, which could extend for days or weeks, typical ranges for the second period of time can include, but are not limited to, from about 1 sec to about 48 hr, from about 10 sec to about 48 hr, from about 30 sec to about 24 hr, from about 30 sec to about 6 hr, from about 1 min to about 6 hr, from about 5 min to about 24 hr, or from about 10 min to about 8 hr.

Often, step (ii) can be conducted by combining the precontacted mixture (e.g., a slurry) with the second mixture comprising the metallocene compound and cyclohexene (and 1-hexene, if used), and mixing to ensure sufficient contacting to form the finished catalyst composition. In one embodiment, the second mixture comprising the metallocene compound and cyclohexene (and 1-hexene, if used) is a slurry, i.e., the metallocene compound is not dissolved at standard temperature (25° C.) and pressure (1 atm). In another embodiment, and more typically, the mixture comprising the metallocene compound and cyclohexene (and 1-hexene, if used) is a solution, i.e., the metallocene compound is substantially dissolved at standard temperature and pressure. In this embodiment, there is no visual precipitation of solid metallocene compound from the solution. Moreover, when the solution is filtered, the absorbance of the solution of the metallocene compound (when tested at a wavelength in the UV-visible spectrum of peak absorbance for the metallocene compound) often does not change by more than 5% from the unfiltered solution.

In another embodiment, an additional amount of an organoaluminum compound can be combined with the precontacted mixture and the second mixture, and this organoaluminum compound can be the same as or different from the organoaluminum compound utilized in the precontacting step. As described herein, the organoaluminum compound can be present as a solution in any suitable hydrocarbon solvent, non-limiting examples of which can include cyclohexane, isobutane, n-butane, n-pentane, isopentane, neopentane, hexane, heptane, and the like, as well as combinations thereof.

In a related embodiment, a catalyst composition consistent with this invention can comprise (I) a precontacted mixture comprising an activator-support and an organoaluminum compound, (II) a metallocene compound, and (III) cyclohexene.

In another related embodiment, a catalyst composition consistent with this invention can comprise (I) a precontacted mixture comprising an activator-support and an organoaluminum compound, (II) a metallocene compound, (III) cyclohexene, and (IV) 1-hexene. The weight ratio of 1-hexene:cyclohexene is not particularly limited, but often falls within a range from about 90:10 to about 20:80, from about 90:10 to about 50:50, or from about 85:15 to about 60:40.

Unexpectedly, these catalyst compositions and methods of their preparation can result in improvements in catalyst activity. For instance, the activity of the catalyst composition can be greater (e.g., by at least about 1%, by at least about 2%, by at least about 10%, by at least about 25%, from about 1% to about 100%, from about 2% to about 50%, or from about 5% to about 50%) than that of a catalyst system obtained by using toluene (or toluene and 1-hexene) instead of cyclohexene in the second mixture, under the same catalyst preparation and polymerization conditions. The same polymerization conditions refer to slurry polymerization conditions, using isobutane as a diluent, and with a polymerization temperature of 90° C. and a reactor pressure of 420 psig. Moreover, all components used to prepare the catalyst systems are held constant (e.g., same amount/type of metallocene compound, same amount/type of organoaluminum, same amount/type of activator-support, such as fluorided silica-coated alumina or sulfated alumina) and all polymerization conditions are held constant (e.g., same polymerization temperature and same polymerization pressure). Hence, the only difference is the method used to produce the catalyst system, i.e., the use of cyclohexene as a diluent or solvent for the metallocene component instead of toluene (and 1-hexene, if used).

In another embodiment, and unexpectedly, the activity of the catalyst composition can be greater (e.g., by at least about 1%, by at least about 2%, by at least about 10%, by at least about 25%, from about 1% to about 100%, from about 2% to about 50%, or from about 5% to about 50%) than that of a catalyst system obtained by using toluene and 1-hexene (or toluene) instead of cyclohexene and 1-hexene in the second mixture, under the same catalyst preparation and polymerization conditions. As above, the same polymerization conditions refer to slurry polymerization conditions, using isobutane as a diluent, and with a polymerization temperature of 90° C. and a reactor pressure of 420 psig. Moreover, all components used to prepare the catalyst systems are held constant (e.g., same amount/type of metallocene compound, same amount/type of organoaluminum, same amount/type of activator-support, such as fluorided silica-coated alumina or sulfated alumina) and all polymerization conditions are held constant (e.g., same polymerization temperature, same pressure). Hence, the only difference is the method used to produce the catalyst system, i.e., the use of cyclohexene and 1-hexene as a diluent or solvent for the metallocene component instead of toluene and 1-hexene (or toluene).

In another embodiment, and unexpectedly, the activity of the catalyst composition can be greater (e.g., by at least about 1%, by at least about 2%, by at least about 10%, by at least about 25%, from about 1% to about 100%, from about 2% to about 50%, or from about 5% to about 50%) than that of a catalyst system obtained by first combining the activator-support and the second mixture, and then combining the organoaluminum compound, under the same polymerization conditions. Again, this comparison is under the same polymerization conditions, such that the only difference is the order or sequence of contacting the respective catalyst components (precontacting the activator-support and the organoaluminum compound versus no precontacting).

In another embodiment, and unexpectedly, the second mixture comprising cyclohexene, 1-hexene, and the metallocene compound has less precipitation of the metallocene compound and/or the metallocene compound precipitates at a lower temperature than that of a mixture containing toluene, 1-hexene, and the metallocene compound, when compared at the same metallocene loading. For instance, in some embodiments, there is substantially no precipitation of the mixture comprising cyclohexene, 1-hexene, and the metallocene compound at 0° C. In these instances, there is no visual precipitation of solid metallocene compound from the solution. Moreover, when the solution is filtered, the absorbance of the solution of the metallocene compound (when tested at a wavelength in the UV-visible spectrum of peak absorbance for the metallocene compound) often does not change by more than 5% from the unfiltered solution. Metallocene solutions in cyclohexene or mixtures with 1-hexene, which can withstand lower temperatures than comparable solutions in toluene alone or mixtures of toluene and 1-hexene, can be beneficial due to the reduced risk of metallocene precipitation during transportation and/or storage.

In other embodiments of this invention, a process for preparing a catalyst composition containing a metallocene compound, an activator-support, and an organoaluminum compound can comprise (or consist essentially of, or consist of) contacting, in any order:
  (a) an activator-support;
  (b) a mixture comprising cyclohexene and a metallocene compound; and
  (c) an organoaluminum compound;
to produce the catalyst composition.

Generally, the features of this process (e.g., the activator-support, the organoaluminum compound, the metallocene compound, the order of contacting, among others) are independently described herein, and these features can be combined in any combination to further describe the disclosed processes. Moreover, other process steps can be conducted before, during, and/or after any of the steps listed in the disclosed processes, unless stated otherwise. Additionally, catalyst compositions produced in accordance with this process are within the scope of this disclosure and are encompassed herein.

In some embodiments, the metallocene mixture can comprise cyclohexene, 1-hexene, and the metallocene compound. Typically, the weight ratio of 1-hexene to cyclohexene (1-hexene:cyclohexene) in the mixture can fall within a range from about 99:1 to about 1:99, from about 95:5 to about 10:90, from about 90:10 to about 20:80, from about 90:10 to about 50:50, from about 90:10 to about 60:40, from about 85:15 to about 25:75, from about 85:15 to about 60:40, or from about 85:15 to about 70:30, and the like. Other appropriate ranges for the weight ratio of 1-hexene:cyclohexene in the mixture are readily apparent from this disclosure.

In this process, the activator-support, the mixture containing the metallocene compound and cyclohexene (and 1-hexene, if used), and the organoaluminum compound can be contacted or combined in any order, and under any suitable conditions, to form the catalyst composition. Thus, a variety of temperatures and time periods can be employed. For instance, the catalyst components can be contacted a temperature in a range from about 0° C. to about 100° C.; alternatively, from about 0° C. to about 75° C.; alternatively, from about 10° C. to about 75° C.; alternatively, from about 20° C. to about 60° C.; alternatively, from about 20° C. to about 50° C.; alternatively, from about 15° C. to about 45° C.; or alternatively, from about 20° C. to about 40° C. In these and other embodiments, these temperature ranges also are meant to encompass circumstances where the components are contacted at a series of different temperatures, instead of at a single fixed temperature, falling within the respective ranges. As an example, the initial contacting of the components of the catalyst system can be conducted at an elevated temperature, following by cooling to a lower temperature for longer term storage of the finished catalyst composition.

The duration of the contacting of the components to form the catalyst composition is not limited to any particular period of time. Hence, this period of time can be, for example, from as little as 1-10 seconds to as long as 24-48 hours, or more. The appropriate period of time can depend upon, for example, the contacting temperature, the respective amounts of the activator-support, metallocene compound, and organoaluminum compound to be contacted or combined, the amount of cyclohexene (and 1-hexene, if used), the degree of mixing, and considerations for long term storage, among other variables. Generally, however, the period of time for contacting can be at least about 5 sec, at least about 10 sec, at least about 30 sec, at least about 1 min, at least about 5 min, at least about 10 min, and so forth. Assuming the catalyst composition is not intended for long term storage, which could extend for days or weeks, typical ranges for the contacting time can include, but are not limited to, from about 1 sec to about 48 hr, from about 10 sec to about 48 hr, from about 30 sec to about 24 hr, from about 30 sec to about 6 hr, from about 1 min to about 6 hr, from about 5 min to about 24 hr, or from about 10 min to about 8 hr.

Often, the activator-support can be present as a slurry. Accordingly, the activator-support can be present as a slurry of the activator-support in a first diluent. The first diluent can comprise any suitable hydrocarbon, illustrative and non-limiting examples of which can include propane, cyclohexane, isobutane, n-butane, n-pentane, isopentane, neopentane, n-hexane, and the like, or combinations thereof. In some embodiments, the first diluent can comprise cyclohexene or 1-hexene, or a mixture of cyclohexene and 1-hexene. Often, the organoaluminum compound also can be present as a solution in any suitable hydrocarbon solvent, and the solvent can be the same as or different from the hydrocarbon present in the slurry of the activator-support. In other embodiments, the activator-support can be present as a dry solid.

In one embodiment, the catalyst composition can be prepared by first contacting the organoaluminum compound and the activator-support, and then combining the mixture containing the metallocene compound and cyclohexene (and 1-hexene, if used), and mixing to ensure sufficient contacting of all components. In another embodiment, the catalyst composition can be prepared by first contacting the organoaluminum compound and the mixture containing the metallocene compound and cyclohexene (and 1-hexene, if used), and then combining the activator-support, and mixing to ensure sufficient contacting of all components. In yet another embodiment, the catalyst composition can be prepared by combining the organoaluminum compound, the activator-support, and the mixture containing the metallocene compound and cyclohexene (and 1-hexene, if used) substantially contemporaneously, and mixing to ensure sufficient contacting of all components. For each of these orders of addition, the activator-support can be present as a slurry in a first diluent or, alternatively, the activator-support can be present as a dry solid. Likewise, the metallocene compound can be present in the mixture with cyclohexene or, alternatively, the metallocene compound can be present in the mixture with cyclohexene and 1-hexene. In these and other embodiments, the organoaluminum compound can be present as a solution in a suitable hydrocarbon solvent.

In one embodiment, the mixture comprising the metallocene compound and cyclohexene (and 1-hexene, if used) is a slurry, i.e., the metallocene compound is not dissolved at standard temperature (25° C.) and pressure (1 atm). In another embodiment, and more typically, the mixture comprising the metallocene compound and cyclohexene (and 1-hexene, if used) is a solution, i.e., the metallocene compound is substantially dissolved at standard temperature and pressure. In this embodiment, there is no visual precipitation of solid metallocene compound from the solution. Moreover, when the solution is filtered, the absorbance of the solution of the metallocene compound (when tested at a wavelength in the UV-visible spectrum of peak absorbance for the metallocene compound) often does not change by more than 5% from the unfiltered solution.

In a related embodiment, a catalyst composition consistent with this invention can comprise (A) an activator-support, (B) an organoaluminum compound, (C) a metallocene compound, and (D) cyclohexene.

In another related embodiment, a catalyst composition consistent with this invention can comprise (A) an activator-support, (B) an organoaluminum compound, (C) a metallocene compound, (D) cyclohexene, and (E) 1-hexene. The weight ratio of 1-hexene:cyclohexene is not particularly limited, but often falls within a range from about 90:10 to about 20:80, from about 90:10 to about 50:50, or from about 85:15 to about 60:40.

Unexpectedly, these catalyst compositions and methods of their preparation can result in improvements in catalyst activity. For instance, the activity of the catalyst composition can be greater (e.g., by at least about 1%, by at least about 2%, by at least about 10%, by at least about 25%, from about 1% to about 100%, from about 2% to about 50%, or from about 5% to about 50%) than that of a catalyst system obtained by using toluene (or toluene and 1-hexene) instead of cyclohexene in the mixture, under the same catalyst preparation and polymerization conditions. The same polymerization conditions refer to slurry polymerization conditions, using isobutane as a diluent, and with a polymerization temperature of 90° C. and a reactor pressure of 420 psig. Moreover, all components used to prepare the catalyst systems are held constant (e.g., same amount/type of metallocene compound, same amount/type of organoaluminum, same amount/type of activator-support, such as fluorided silica-coated alumina or sulfated alumina) and all polymerization conditions are held constant (e.g., same polymerization temperature, same pressure). Hence, the only difference is the method used to produce the catalyst system, i.e., the use of cyclohexene as a diluent or solvent for the metallocene component instead of toluene (and 1-hexene, if used).

In another embodiment, and unexpectedly, the activity of the catalyst composition can be greater (e.g., by at least about 1%, by at least about 2%, by at least about 10%, by at least about 25%, from about 1% to about 100%, from about 2% to about 50%, or from about 5% to about 50%) than that of a catalyst system obtained by using toluene and 1-hexene (or toluene) instead of cyclohexene and 1-hexene in the mixture, under the same catalyst preparation and polymerization conditions. As above, the same polymerization conditions refer to slurry polymerization conditions, using isobutane as a diluent, and with a polymerization temperature of 90° C. and a reactor pressure of 420 psig. Moreover, all components used to prepare the catalyst systems are held constant (e.g., same amount/type of metallocene compound, same amount/type of organoaluminum, same amount/type of activator-support, such as fluorided silica-coated alumina or sulfated alumina) and all polymerization conditions are held constant (e.g., same polymerization temperature and same polymerization pressure). Hence, the only difference is the method used to produce the catalyst system, i.e., the use of cyclohexene and 1-hexene as a diluent or solvent for the metallocene component instead of toluene and 1-hexene (or toluene).

In another embodiment, and unexpectedly, the mixture comprising cyclohexene, 1-hexene, and the metallocene compound has less precipitation of the metallocene compound and/or the metallocene compound precipitates at a lower temperature than that of a mixture containing toluene, 1-hexene, and the metallocene compound, when compared at the same metallocene loading. For instance, in some embodiments, there is substantially no precipitation of the mixture comprising cyclohexene, 1-hexene, and the metallocene compound at 0° C. In these instances, there is no visual precipitation of solid metallocene compound from the solution. Moreover, when the solution is filtered, the absorbance of the solution of the metallocene compound (when tested at a wavelength in the UV-visible spectrum of peak absorbance for the metallocene compound) often does not change by more than 5% from the unfiltered solution.

Consistent with certain embodiments of this invention, the catalyst composition and the method of preparing the catalyst composition can comprise more than one metallocene compound, for example, one bridged metallocene compound and one unbridged metallocene compound, or two or more bridged metallocene compounds, or two or more unbridged metallocene compounds. In such instances, the weight ratio (wt. %:wt. %) of the first metallocene compound to the second metallocene compound generally can be in a range of from about 1:100 to about 100:1, from about 1:50 to about 50:1, from about 1:25 to about 25:1, from about 1:10 to about 10:1, or from about 1:5 to about 5:1. Accordingly, suitable ranges for the weight ratio of the first metallocene compound to the second metallocene compound can include, but are not limited to, from about 1:15 to about 15:1, from about 1:10 to about 10:1, from about 1:8 to about 8:1, from about 1:5 to about 5:1, from about 1:4 to about 4:1, from about 1:3 to about 3:1, from about 1:2 to about 2:1, from about 1:1.8 to about 1.8:1, from about 1:1.5 to about 1.5:1, from about 1:1.3 to about 1.3:1, from about 1:1.25 to about 1.25:1, from about 1:1.2 to about 1.2:1, from about 1:1.15 to about 1.15:1, from about 1:1.1 to about 1.1:1, or from about 1:1.05 to about 1.05:1, and the like.

Generally, in the catalyst compositions and methods of their preparation disclosed herein, the weight ratio (wt. %:wt. %) of activator-support(s) to organoaluminum compound(s) can be in a range from about 1:10 to about 1000:1, or from about 1:5 to about 1000:1. If more than one organoaluminum compound and/or more than one activator-support are employed, this ratio is based on the total weight of each respective component. In an embodiment, the weight ratio of the activator-support to the organoaluminum compound can be in a range from about 1:1 to about 500:1, from about 1:3 to about 200:1, or from about 1:1 to about 100:1.

Likewise, the weight ratio (wt. %:wt. %) of metallocene compound(s) to activator-support(s) can be in a range from about 1:1 to about 1:1,000,000, or from about 1:5 to about 1:250,000. If more than one metallocene compound and/or more than one activator-support are employed, this ratio is based on the total weight of each respective component. In an embodiment, the weight ratio of metallocene compound to activator-support can be in a range from about 1:10 to about 1:10,000, or from about 1:20 to about 1:1000.

In some embodiments, the catalyst compositions and methods of their preparation are substantially free of aluminoxane compounds, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these embodiments, the catalyst composition has catalyst activity, as discussed herein, in the absence of these additional materials. For example, a catalyst composition of the present invention can consist essentially of a metallocene compound, an activator-support, an organoaluminum compound, and cyclohexene (or consist essentially of a metallocene compound, an activator-support, an organoaluminum compound, cyclohexene, and 1-hexene), wherein no other materials are present in the catalyst composition which would increase/decrease the activity of the catalyst composition by more than about 10% from the catalyst activity of the catalyst composition in the absence of said materials.

Metallocene Compounds

Metallocene-based catalyst compositions consistent with this invention can contain a bridged metallocene compound and/or an unbridged metallocene compound. Metallocene-based catalyst compositions consistent with this invention can also contain two or more bridged metallocene compounds and/or two or more unbridged metallocene compounds. The metallocene compound can comprise, for example, a transition metal (one or more than one) from Groups IIIB-VIIIB of the Periodic Table of the Elements. In one embodiment, the metallocene compound can comprise a Group III, IV, V, or VI transition metal, or a combination of two or more transition metals. The metallocene compound can comprise chromium, titanium, zirconium, hafnium, vanadium, or a combination thereof, or can comprise titanium, zirconium, hafnium, or a combination thereof, in other embodiments. In further embodiments, the metallocene compound can comprise titanium, or zirconium, or hafnium, either singly or in combination.

In some embodiments of this invention, the metallocene compound can comprise a bridged metallocene compound, e.g., with titanium, zirconium, or hafnium, such as a bridged zirconium or hafnium based metallocene compound with a fluorenyl group, and with no aryl groups on the bridging group, or a bridged zirconium or hafnium based metallocene compound with a cyclopentadienyl group and a fluorenyl group, and with no aryl groups on the bridging group. Such bridged metallocenes, in some embodiments, can contain an alkenyl substituent (e.g., a terminal alkenyl) on the bridging group and/or on a cyclopentadienyl-type group (e.g., a cyclopentadienyl group or a fluorenyl group). In another embodiment, the metallocene compound can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other embodiments, the aryl group on the bridging group can be a phenyl group. Optionally, these bridged metallocenes can contain an alkenyl substituent (e.g., a terminal alkenyl) on the bridging group and/or on a cyclopentadienyl-type group.

In some embodiments, the metallocene compound can comprise a bridged zirconium or hafnium based metallocene compound with two indenyl groups (e.g., a bis-indenyl metallocene compound). Hence, the metallocene compound can comprise a bridged zirconium based metallocene compound with two indenyl groups, or alternatively, a bridged hafnium based metallocene compound with two indenyl groups. In some embodiments, an aryl group can be present on the bridging group, while in other embodiments, there are no aryl groups present on the bridging group. Optionally, these bridged indenyl metallocenes can contain an alkenyl substituent (e.g., a terminal alkenyl) on the bridging group and/or on the indenyl group (one or both indenyl groups). The bridging atom of the bridging group can be, for instance, a carbon atom or a silicon atom; alternatively, the bridge can contain a chain of two carbon atoms, a chain of two silicon atoms, and so forth.

Illustrative and non-limiting examples of bridged metallocene compounds (e.g., with zirconium or hafnium) that can be employed in catalyst systems consistent with embodiments of the present invention are described in U.S. Pat. Nos. 7,026,494, 7,041,617, 7,226,886, 7,312,283, 7,517,939, and 7,619,047, the disclosures of which are incorporated herein by reference in their entirety.

In some embodiments of this invention, the metallocene compound can comprise an unbridged metallocene; alternatively, an unbridged zirconium or hafnium based metallocene compound and/or an unbridged zirconium and/or hafnium based dinuclear metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with embodiments of the present invention are described in U.S. Pat. Nos. 7,199,073, 7,226,886, 7,312,283, and 7,619,047, the disclosures of which are incorporated herein by reference in their entirety.

Moreover, the metallocene compound can comprise an unbridged dinuclear metallocene such as those described in U.S. Pat. Nos. 7,919,639 and 8,080,681, the disclosures of which are incorporated herein by reference in their entirety. The metallocene compound can comprise an unbridged zirconium and/or hafnium based dinuclear metallocene compound. For example, the metallocene compound can comprise an unbridged zirconium based homodinuclear metallocene compound, or an unbridged hafnium based homodinuclear metallocene compound, or an unbridged zirconium and/or hafnium based heterodinuclear metallocene compound (i.e., a dinuclear compound with two hafniums, or two zirconiums, or one zirconium and one hafnium).

Embodiments of this invention also are directed to catalyst compositions and methods of preparing catalyst compositions in which two or more metallocene compounds are employed, e.g., a dual metallocene catalyst composition. Independently, each respective metallocene compound can be any bridged metallocene compound disclosed herein or any unbridged metallocene compound disclosed herein.

Activator-Supports

The present invention encompasses various catalyst compositions containing an activator-support, and various methods of preparing catalyst compositions using an activator-support. In one embodiment, the activator-support can comprise a solid oxide treated with an electron-withdrawing anion. Alternatively, in another embodiment, the activator-support can comprise a solid oxide treated with an electron-withdrawing anion, the solid oxide containing a Lewis-acidic metal ion. Non-limiting examples of suitable activator-supports are disclosed in, for instance, U.S. Pat. Nos. 7,294,599, 7,601,665, 7,884,163, and 8,309,485, which are incorporated herein by reference in their entirety.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163.

Accordingly, in one embodiment, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another embodiment, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another embodiment, the solid oxide can comprise silica, alumina, titania, zirconia, magnesia, boria, zinc oxide, any mixed oxide thereof, or any combination thereof. In yet another embodiment, the solid oxide can comprise silica-alumina, silica-coated alumina, silica-titania, silica-zirconia, alumina-boria, or any combination thereof. In still another embodiment, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have an silica content from about 5% to about 95% by weight. In one embodiment, the silica content of these solid oxides can be from about 10% to about 80%, or from about 20% to about 70%, silica by weight. In another embodiment, such materials can have silica contents ranging from about 15% to about 60%, or from about 25% to about 50%, silica by weight. The solid oxides contemplated herein can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one embodiment, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some embodiments provided herein. In other embodiments, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other embodiments, the electron-withdrawing anion can comprise fluoride and/or sulfate.

The activator-support generally can contain from about 1 to about 25 wt. % of the electron-withdrawing anion, based on the weight of the activator-support. In particular embodiments provided herein, the activator-support can contain from about 1 to about 20 wt. %, from about 2 to about 20 wt. %, from about 3 to about 20 wt. %, from about 2 to about 15 wt. %, from about 3 to about 15 wt. %, from about 3 to about 12 wt. %, or from about 4 to about 10 wt. %, of the electron-withdrawing anion, based on the total weight of the activator-support.

In an embodiment, the activator-support can comprise fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, and the like, as well as any mixture or combination thereof. In another embodiment, the activator-support employed in the processes and catalyst systems described herein can be, or can comprise, a fluorided solid oxide and/or a sulfated solid oxide and/or a phosphated solid oxide, non-limiting examples of which can include fluorided alumina, sulfated alumina, phosphated alumina, fluorided silica-alumina, sulfated silica-alumina, phosphated silica-alumina, fluorided silica-zirconia, fluorided silica-coated alumina, fluorided-chlorided silica-coated alumina, sulfated silica-coated alumina, phosphated silica-coated alumina, and the like, as well as combinations thereof. In yet another embodiment, the activator-support can comprise fluorided alumina; alternatively, chlorided alumina; alternatively, sulfated alumina; alternatively, phosphated alumina; alternatively, fluorided silica-alumina; alternatively, sulfated silica-alumina; alternatively, phosphated silica-alumina; alternatively, fluorided silica-zirconia; alternatively, chlorided silica-zirconia; alternatively, sulfated silica-coated alumina; alternatively, phosphated silica-coated alumina; alternatively, fluorided-chlorided silica-coated alumina; or alternatively, fluorided silica-coated alumina.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, or phosphated solid oxides) are well known to those of skill in the art.

Organoaluminum Compounds

The present invention encompasses various catalyst compositions containing an organoaluminum compound, and various methods of preparing catalyst compositions using an organoaluminum compound. More than one organoaluminum compound can be used. For instance, a mixture or combination of two suitable organoaluminum compounds can be used in the processes and catalyst systems disclosed herein.

In some embodiments, suitable organoaluminum compounds can have the formula, $(R^Z)_3Al$, wherein each $R^Z$ independently can be an aliphatic group having from 1 to 10 carbon atoms. For example, each $R^Z$ independently can be methyl, ethyl, propyl, butyl, hexyl, or isobutyl. In other embodiments, suitable organoaluminum compounds can have the formula, $Al(X^7)_m(X^8)_{3-m}$, wherein each $X^7$ independently can be a hydrocarbyl; each $X^8$ independently can be an alkoxide or an aryloxide, a halide, or a hydride; and m can be from 1 to 3, inclusive. Hydrocarbyl is used herein to specify a hydrocarbon radical group and includes, for instance, aryl, alkyl, cycloalkyl, alkenyl, cycloalkenyl, cycloalkadienyl, alkynyl, aralkyl, aralkenyl, and aralkynyl groups. In one embodiment, each $X^7$ independently can be any hydrocarbyl having from 1 to about 18 carbon atoms, or from 1 to about 8 carbon atoms, or an alkyl having from 1 to 10 carbon atoms. For example, each $X^7$ independently can be methyl, ethyl, propyl, n-butyl, sec-butyl, isobutyl, or hexyl, and the like, in certain embodiments of the present invention. According to another embodiment of the present invention, each $X^8$ independently can be an alkoxide or an aryloxide, any one of which has from 1 to 18 carbon atoms, a halide, or a hydride. In yet another embodiment of the present invention, each $X^8$ can be selected independently from fluorine and chlorine. In the formula, $Al(X^7)_m(X^8)_{3-m}$, m can be a number from 1 to 3 (inclusive) and typically, m can be 3. The value of m is not restricted to be an integer; therefore, this formula can include sesquihalide compounds or other organoaluminum cluster compounds.

Examples of organoaluminum compounds suitable for use in accordance with the present invention can include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof. In one embodiment, an organoaluminum compound used in the processes and catalyst systems disclosed herein can comprise (or consist essentially of, or consist of) triethylaluminum (TEA), while in another embodiment, an organoaluminum compound used in the processes and catalyst systems disclosed herein can comprise (or consist essentially of, or consist of) triisobutylaluminum (TIBA). Yet in another embodiment, a mixture of TEA and TIBA can be used as the organoaluminum component in the processes described herein (or as the organoaluminum component in the catalyst systems disclosed herein).

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization and terpolymerization, reactions using an olefin monomer with at least one different olefinic compound. For example, resultant ethylene copolymers, or terpolymers, generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (α), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an embodiment, the olefin monomer can comprise a $C_2$-$C_{20}$ olefin; alternatively, a $C_2$-$C_{20}$ α-olefin; alternatively, a $C_2$-$C_{12}$ olefin; alternatively, a $C_2$-$C_{10}$ α-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can be, for example, ethylene or propylene, which is copolymerized with at least one comonomer (e.g., a $C_2$-$C_{20}$ α-olefin, a $C_3$-$C_{20}$ α-olefin). According to one embodiment, the olefin monomer in the polymerization process can be ethylene. In this embodiment, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another embodiment, the comonomer can comprise an α-olefin (e.g., a $C_3$-$C_{10}$ α-olefin), while in yet another embodiment, the comonomer can comprise 1-butene, 1-pentene, 1-hexene, 1-octene, 1-decene, styrene, or any combination thereof. For example, the comonomer can comprise 1-butene, 1-hexene, 1-octene, or a combination thereof.

Generally, the amount of comonomer introduced into a polymerization reactor to produce the copolymer can be from about 0.01 to about 50 weight percent of the comonomer based on the total weight of the monomer and comonomer. According to another embodiment, the amount of comonomer introduced into a polymerization reactor can be from about 0.01 to about 40 weight percent comonomer based on the total weight of the monomer and comonomer. In still another embodiment, the amount of comonomer introduced into a polymerization reactor can be from about 0.1 to about 35 weight percent comonomer based on the total weight of the monomer and comonomer. Yet, in another embodiment, the amount of comonomer introduced into a polymerization reactor can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one embodiment, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/α-olefin, ethylene/1-butene, ethylene/1-hexene, or ethylene/1-octene), a propylene copolymer, an ethylene terpolymer, a propylene terpolymer, and the like, including combinations thereof. In one embodiment, the olefin polymer can be (or can comprise) an ethylene homopolymer, an ethylene/1-butene copolymer, an ethylene/1-hexene copolymer, or an ethylene/1-octene copolymer; or alternatively, an ethylene/1-hexene copolymer. In another embodiment, the olefin polymer can be (or can comprise) a polypropylene homopolymer or a propylene-based copolymer. In some embodiments, the olefin polymer can have a bimodal molecular weight distribution, while in other embodiments, the olefin polymer can have a multimodal molecular weight distribution. Yet, in still other embodiments, the olefin polymer can have a unimodal molecular weight distribution.

Polymerization Reactor Systems and Processes

The disclosed catalyst systems and methods of their preparation are intended for any olefin polymerization process using various types of polymerization reactors, polymerization reactor systems, and polymerization reaction conditions. As used herein, "polymerization reactor" includes any polymerization reactor capable of polymerizing olefin monomers and comonomers (one or more than one comonomer) to produce homopolymers, copolymers, terpolymers, and the like. The various types of polymerization reactors include, but are not limited to, those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave reactors, tubular reactors, or combinations thereof, in parallel or in series. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (for example, 2 reactors, or more than 2 reactors) of the same or different type. For example, the polymerization reactor system can comprise a slurry reactor, a gas-phase reactor, a solution reactor, or a combination of two or more of these reactors. Production of polymers in multiple reactors can include several stages in at least two separate polymerization reactors interconnected by at least one transfer device, making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one embodiment, the polymerization reactor system can comprise at least one loop slurry reactor comprising vertical or horizontal loops. Monomer, diluent, catalyst, and comonomer can be continuously fed into a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another embodiment, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another embodiment, the polymerization reactor system can comprise a high pressure polymerization reactor, e.g., can comprise a tubular reactor and/or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another embodiment, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously or pulsed), and as discussed hereinabove.

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor. In some reactor systems, the polymerization temperature generally can be within a range from about 70° C. to about 110° C., or from about 75° C. to about 95° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages to the polymerization reaction process.

Also encompassed herein are olefin polymerization processes utilizing any of the catalyst compositions described herein. One such process can comprise contacting a catalyst composition with an olefin monomer and optionally an olefin comonomer in a polymerization reactor system under polymerization conditions to produce an olefin polymer. Generally, the polymerization process can utilize any olefin monomer and optional comonomer disclosed herein, and the catalyst composition employed can be a single (or dual) metallocene catalyst system utilizing, for instance, any of the metallocene compounds, any of activator-supports, and any of the organoaluminum compounds disclosed herein, and the catalyst system can be prepared by any of the processes disclosed herein.

A metallocene-based catalyst composition, in one embodiment, can be produced by a process comprising contacting, in any order, (a) an activator-support, (b) a mixture comprising a metallocene compound and cyclohexene, 1-hexene, or a mixture of cyclohexene and 1-hexene, and (c) an organoaluminum compound, to produce the catalyst composition. A metallocene-based catalyst composition, in another embodiment, can be produced by a process comprising (i) contacting an activator-support and an organoaluminum compound for a first period of time to form a precontacted mixture, and (ii) contacting the precontacted mixture with a second mixture comprising a metallocene compound and cyclohexene, 1-hexene, or a mixture thereof, for a second period of time to form the catalyst composition.

Polymerization processes consistent with this invention can comprise contacting such catalyst compositions (i.e., prepared using cyclohexene, 1-hexene, or a mixture of cyclohexene and 1-hexene) with an olefin monomer and optionally an olefin comonomer in a polymerization reactor system under polymerization conditions to produce an olefin polymer. As described herein, the catalyst activities of these catalyst compositions, unexpectedly, can be greater than that of catalyst systems obtained by using toluene, under the same catalyst preparation conditions, and when tested under the same polymerization conditions.

This invention is also directed to, and encompasses, the polymers produced by any of the polymerization processes disclosed herein. Beneficially, the polymer (e.g., an ethylene polymer) can contain substantially no residual toluene, i.e., less than 5 ppm by weight. In some embodiments, the polymer can contain less than 2 ppm by weight toluene, or further, no measurable amount of toluene. Since the mixture of the metallocene compound and cyclohexene and/or 1-hexene used to produce the catalyst system disclosed herein does not require toluene, which recent regulations indicate may have a number of hazards associated with it, this is a potential benefit of the present invention.

Also beneficially, and unexpectedly, the polymers produced using the disclosed catalyst systems can have lower levels of residual solvents by using cyclohexene instead of toluene. While not wishing to be bound by theory, it is believed that the cyclohexene may be more easily removed from the polymer than toluene (e.g., when present at the same level), thus resulting in less residual solvents present in the finished polymer. Accordingly, an olefin polymer produced using the polymerization processes and catalyst systems disclosed herein with cyclohexene (and 1-hexene, if used) can have lower levels of residual solvents than that of an olefin polymer obtained using a catalyst system prepared using toluene (and 1-hexene, if used), under the same catalyst preparation and polymerization conditions.

Articles of manufacture can be formed from, and/or can comprise, the polymers (e.g., ethylene copolymers) of this invention and, accordingly, are encompassed herein. For example, articles that can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Also contemplated herein is a method for forming or preparing an article of manufacture comprising a polymer produced by any of the polymerization processes disclosed herein. For instance, a method can comprise (i) contacting any catalyst composition disclosed herein with an olefin monomer and an optional olefin comonomer under polymerization conditions in a polymerization reactor system to produce an olefin polymer (the catalyst composition can be prepared in accordance with any process disclosed herein); and (ii) forming an article of manufacture comprising the olefin polymer. The forming step can comprise blending, melt processing, extruding, molding, or thermoforming, and the like, including combinations thereof.

EXAMPLES

Embodiments of the invention are further illustrated by the following examples, which are not to be construed in any way as imposing limitations to the scope of this invention described herein. Various other aspects, embodiments, modifications, and equivalents thereof which, after reading the description herein, can suggest themselves to one of ordinary skill in the art without departing from the spirit of the present invention or the scope of the appended claims.

Sulfated alumina activator-supports were prepared as follows. Bohemite was obtained from W.R. Grace & Company under the designation "Alumina A" and having a surface area of about 300 m²/g and a pore volume of about 1.3 mL/g. This material was obtained as a powder having an average particle size of about 100 microns. This material was impregnated to incipient wetness with an aqueous solution of ammonium sulfate to equal about 15% sulfate. The pore filling or "incipient wetness" impregnation technique used is a method in which the solution is mixed with the dry support until the pores are filled. The definition of the end point of this method may vary somewhat from laboratory to laboratory so that an impregnated catalyst could have a completely dry appearance or a sticky snow-like appearance. However, in no instances would there be any free flowing liquid present when the incipient wetness method is employed. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina was collected and stored under dry nitrogen, and was used without exposure to the atmosphere.

The polymerization experiments were performed as follows. First, 0.6 mmol of triisobutylaluminum (TIBA, 0.6 mL of a 1M solution in heptane) was added to the reactor while venting isobutane vapor. Next, 100 mg of the sulfated alumina activator-support was added to the reactor, followed by a metallocene solution containing 2 mg of the respective metallocene compound (metallocene concentration ranged from about 0.2 to about 1.4 wt. %). The metallocene solutions were prepared by dissolving the desired amount of the metallocene compound in the respective solvent or blend of solvents. The reactor contents were mixed, the charge port was closed, and 2 L of isobutane were added to the reactor. The contents of the reactor were stirred and heated to the desired polymerization reaction temperature of 90° C., and ethylene was then introduced into the reactor (no hydrogen or comonomer was used). Ethylene was fed on demand to maintain the target pressure of 420 psig pressure for the 30 min length of each polymerization experiment. The reactor was maintained at the desired reaction temperature throughout the experiment by an automated heating-cooling system.

The chemical structures for the metallocene compounds used in the examples that follow are provided below (stereochemistry is not shown).

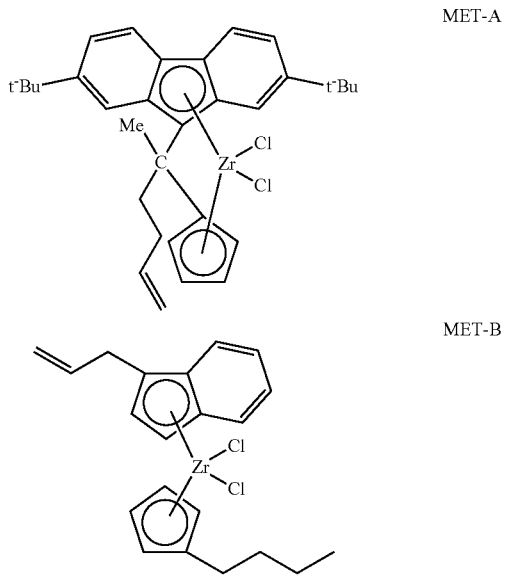

Examples 1-8

Catalyst Activity Improvement Via the Use of a Solution of a Metallocene Compound and Cyclohexene Alone or in Combination with 1-Hexene to Prepare the Catalyst System, Instead of Using Toluene Alone or in Combination with 1-Hexene Table I summarizes certain catalyst system components and the catalyst activity results (grams of polyethylene produced per gram of metallocene compound per hour) for Examples 1-8. As shown in Table I, and unexpectedly, using a blend of 20% cyclohexene and 80% 1-hexene instead of 100% toluene as the solvent for the metallocene during the catalyst preparation process resulted in a 21% improvement in activity for MET-A (Examples 1-2) and a 3% improvement in activity for MET-B (Examples 7-8). Furthermore, and quite surprisingly, using cyclohexene instead of toluene as the solvent for the metallocene during the catalyst preparation process resulted in a 36% improvement in activity (Examples 3-4), while using a blend of 20% cyclohexene and 80% 1-hexene instead of 20% toluene and 80% 1-hexene as the solvent for the metallocene during the catalyst preparation process resulted in an 18% improvement in activity (Examples 5-6).

Examples 9-11

Solvent Impact on Metallocene Precipitation

Metallocene solutions of MET-A in a blend of toluene and 1-hexene, cyclohexene, and a blend of cyclohexene and 1-hexene were prepared at metallocene concentrations in the 0.3-0.4 wt. % range. Table II summarizes the results. Example 9 showed visible precipitation at 8° C. in the blend of toluene and 1-hexene, while unexpectedly, there was no visible precipitation in the solution with cyclohexene (Example 10) or in the blend of cyclohexene and 1-hexene (Example 11) at temperatures below 0° C.

Examples 12-13

Solvent Impact on the Level of Residual Solvent in Polyethylene

Polyethylene was produced as described in Examples 1-8 using catalyst systems in which toluene was the solvent for the metallocene (Example 12) and cyclohexene was the solvent for the metallocene (Example 13). The polymer fluff produced in Examples 12-13 was not dried to remove any residual solvent, and was tested for solvent level (ppm by weight) using headspace gas chromatography (GC)—this is denoted as the initial solvent level in Table III. After drying the polymer fluff at 60° C. under reduced pressure for 2 hours to remove residual solvent, the polymer fluff was again tested for solvent level (ppm by weight) using headspace GC—this is denoted as the final solvent level in Table III. Quite surprisingly, cyclohexene present in the polymer was easier to remove from the polymer than the toluene: 61.8% of the cyclohexene was removed, versus 39.8% of the toluene, under the same test conditions. Thus, not only can cyclohexene replace toluene as the catalyst solvent, but the polymer produced can have lower levels of residual solvents.

The headspace GC was performed using an AutoDesorb Short Path Thermal Desorption system (Scientific Instrument Services, Inc.) sitting atop the split injection port of a gas chromatograph (Agilent Technologies, Model 6890). The gas chromatograph was interfaced to a mass spectrometer (Agilent Technologies, Model 5973 Mass Selective Detector). Gas chromatograph and mass selective detector (MSD) instrument parameters are shown below.

GC Parameters

| Column | J&W DB-5MS | Split Ratio | 10:1 |
|---|---|---|---|
| Column Length | 60 m | Injector Temperature | 250° C. |
| Column Internal Diameter | 0.25 mm | Oven Initial Temperature | 35° C. |
| Column Phase Thickness | 0.25 micron | Oven Initial Time | 5 minutes |
| Column Carrier Gas | Helium | Oven Temperature Ramp #1 | 6° C./minute |
| Carrier Gas Flow Mode | Constant Flow | Oven Final Temperature #1 | 300° C. |
| Carrier Gas Flowrate | 1 mL/minute | Oven Final Temperature Hold Time | 0 minutes |
| Injection type | Split | Oven to MSD interface Temperature | 300° C. |
| MSD parameters | | | |
| Acquisition Mode | Scan | Scan Range | 12-500 m/z |
| Ionization Mode | Electron Impact | Quadrapole Temperature | 200° C. |
| Ionization Potential | 70 eV | Source Temperature | 230° C. |

The AutoDesorb Short Path Thermal Desorption system utilized a 4"×¼" Silico-Steel coated stainless steel sample tube with an internal diameter of 3 mm. Attached to one end of the tube was a stainless steel needle approximately 1½" long. The other end of the tube was coupled to the AutoDesorb sampler. During the thermal desorption process, the tube was held vertically over the GC injection port by the AutoDesorb sampler with the needle penetrating the injection port septum so that all volatilized components from sample inside the tube entered directly into the GC injection port through the short needle path. A cryofocuser was attached to the GC column approximately 2" below the injection port inside the GC oven so that all volatilized components were trapped and focused on the GC column during the entire desorption/volatilization process. During the desorption/volatilization process, helium flowed through the tube at a flowrate of approximately 10 mL/min to sweep volatilized components into the GC injection port. At the end of the desorption/volatilization process, a heater embedded within the cryofocuser rapidly heated the column where cryofocusing occurred and the gas chromatographic run started.

Prior to polymer sample introduction into AutoDesorb sample tubes, a small plug of silianized glass wool was placed into each tube. A set of six tubes was then conditioned at 400° C. under continuous nitrogen flow for four hours. After conditioning, at least one tube from each set was analyzed as a blank using the same methodology as used for samples to verify the cleanliness of the tube set.

Sample preparation consisted of placing 20 to 60 mg, accurately weighed, of small polymer sample pieces inside an AutoDesorb sample tube where they were held in place at the approximate linear center of the tube by the glass wool plug. When samples were in pellet form, 4-5 pellets chosen at random points within the original sample container were used to obtain a representative aliquot. After all of the pellets were cut into smaller pieces, a random sampling of the smaller cut pieces were utilized to weigh the amount of sample needed. The prepared sample tubes were placed into the AutoDesorb carousel for subsequent analysis.

Each prepared sample tube was analyzed automatically according to the steps and conditions shown below.

| Step 1 | Heat tube heater blocks to 150° C. |
|---|---|
| Step 2 | Cool cryofocuser to −130° C. |
| Step 3 | Purge tube contents at room temperature for 1 minute with helium to remove residual air and moisture. |

-continued

| Step 4 | Insert tube needle into GC injection port. |
|---|---|
| Step 5 | Check that all GC inlet and column pressures are correct. This indicates that helium is flowing through tube at the correct flowrate. |
| Step 6 | Clamp tube heater blocks around tube to heat tube instantaneously to 150° C. |
| Step 7 | Hold tube at 150° C. with needle inside GC injection port for 10 minutes. During this time, the polymer sample pieces melt and volatile components are swept from the tube and cryogenically trapped at the head of the GC column. |
| Step 8 | Remove heater blocks from tube and remove tube needle from GC injection port. |
| Step 9 | Rapidly heat cryofocuser to 200° C. to release focused volatile components for GC column separation. |
| Step 10 | Start GC instrument run and collect chromatographic/mass spectrometric data for separated volatile components. |

TABLE I

Summary of Examples 1-8.

| Example | Solvent System | Metallocene | Metallocene Concentration (wt. %) | Activity (g PE/g MET/hr) | Activity Improvement (%) |
|---|---|---|---|---|---|
| 1 | 100% Toluene | MET-A | 0.22 | 259,000 | 21.2 |
| 2 | 20% Cyclohexene/ 80% 1-hexene | MET-A | 0.33 | 314,000 | |
| 3 | 100% Toluene | MET-A | 0.22 | 188,700 | 36.4 |
| 4 | 100% Cyclohexene | MET-A | 1.40 | 257,400 | |
| 5 | 20% Toluene/ 80% 1-hexene | MET-A | 0.35 | 186,100 | 18.2 |
| 6 | 20% Cyclohexene/ 80% 1-hexene | MET-A | 0.33 | 220,000 | |
| 7 | 100 % Toluene | MET-B | 0.20 | 138,200 | 2.9 |
| 8 | 20% Cyclohexene/ 80% 1-hexene | MET-B | 0.18 | 142,200 | |

TABLE II

Summary of Examples 9-11.

| Example | Solvent System | Metallocene | Metallocene Concentration (wt. %) | Temperature (° C.) | Precipitate Visible? |
|---|---|---|---|---|---|
| 9 | 20% Toluene/ 80% 1-hexene | MET-A | 0.35 | 8 | Yes |
| 10 | 100% Cyclohexene | MET-A | 0.40 | −21 | No |
| 11 | 20% Cyclohexene/ 80% 1-hexene | MET-A | 0.33 | −5 | No |

TABLE III

Summary of Examples 12-13.

| Example | Solvent System | Metallocene | Initial Solvent Level (ppm) | Final Solvent Level (ppm) | Decrease in Solvent (%) |
|---|---|---|---|---|---|
| 12 | 100% Toluene | MET-A | 24.1 | 14.5 | 39.8 |
| 13 | 100% Cyclohexene | MET-A | 20.7 | 7.9 | 61.8 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A process to produce a catalyst composition, the process comprising contacting, in any order:
 (a) an activator-support;
 (b) a mixture comprising cyclohexene and a metallocene compound; and
 (c) an organoaluminum compound;
to produce the catalyst composition.

Embodiment 2

The process defined in embodiment 1, wherein the mixture comprises cyclohexene, 1-hexene, and the metallocene compound.

Embodiment 3

The process defined in embodiment 2, wherein the weight ratio of 1-hexene to cyclohexene (1-hexene:cyclohexene) in the mixture is in any range of weight ratios disclosed herein, e.g., from about 90:10 to about 20:80, from about 90:10 to about 50:50, or from about 85:15 to about 60:40.

Embodiment 4

The process defined in any one of the preceding embodiments, wherein the activator-support, the mixture comprising cyclohexene and the metallocene compound (and 1-hexene, if used), and the organoaluminum compound are contacted for any time period sufficient to form the catalyst composition, e.g., from about 1 sec to about 48 hr, from about 30 sec to about 6 hr, at least about 5 sec, or at least about 1 min.

Embodiment 5

The process defined in any one of the preceding embodiments, wherein the activator-support is present as a slurry of the activator-support in a first diluent.

Embodiment 6

The process defined in embodiment 5, wherein the first diluent comprises any suitable non-polar hydrocarbon.

Embodiment 7

The process defined in embodiment 5, wherein the first diluent comprises propane, cyclohexane, isobutane, n-butane, n-pentane, isopentane, neopentane, n-hexane, or combinations thereof.

Embodiment 8

The process defined in embodiment 5, wherein the first diluent comprises cyclohexene, 1-hexene, or both.

Embodiment 9

The process defined in any one of embodiments 1-4, wherein the activator-support is present as a dry solid.

Embodiment 10

The process defined in any one of embodiments 1-9, wherein the mixture comprising cyclohexene and the metallocene compound (and 1-hexene, if used) is a solution, i.e., the metallocene compound is substantially dissolved at standard temperature and pressure.

Embodiment 11

The process defined in any one of embodiments 1-9, wherein the mixture comprising cyclohexene and the metallocene compound (and 1-hexene, if used) is a slurry, i.e., the metallocene compound is not dissolved at standard temperature and pressure.

Embodiment 12

The process defined in any one of the preceding embodiments, wherein the organoaluminum compound is present as a solution in any suitable hydrocarbon solvent.

Embodiment 13

The process defined in embodiment 12, wherein the hydrocarbon solvent comprises cyclohexane, isobutane, n-butane, n-pentane, isopentane, neopentane, hexane, heptane, or combinations thereof.

Embodiment 14

A catalyst composition produced by the process defined in any one of the preceding embodiments.

Embodiment 15

A catalyst composition comprising:
(A) an activator-support;
(B) an organoaluminum compound;
(C) a metallocene compound; and
(D) cyclohexene.

Embodiment 16

A catalyst composition comprising:
(A) an activator-support;
(B) an organoaluminum compound;
(C) a metallocene compound;
(D) cyclohexene; and
(E) 1-hexene.

Embodiment 17

The process or composition defined in any one of embodiments 1-16, wherein an activity of the catalyst composition is greater (by any amount disclosed herein, e.g., at least about 1%, at least about 10%, at least about 25%, from about 1% to about 100%, or from about 5% to about 50%) than that of a catalyst system obtained by using toluene (or toluene and 1-hexene) instead of cyclohexene, under the same catalyst preparation and polymerization conditions.

Embodiment 18

The process or composition defined in any one of embodiments 2-16, wherein an activity of the catalyst composition is greater (by any amount disclosed herein, e.g., at least about 1%, at least about 10%, at least about 25%, from about 1% to about 100%, or from about 5% to about 50%) than that of a catalyst system obtained by using toluene and 1-hexene (or toluene) instead of cyclohexene and 1-hexene, under the same catalyst preparation and polymerization conditions.

Embodiment 19

The process or composition defined in any one of embodiments 2-18, wherein the mixture comprising cyclohexene, 1-hexene, and the metallocene compound has less precipitation of the metallocene compound and/or the metallocene compound precipitates at a lower temperature than that of a mixture containing toluene, 1-hexene, and the metallocene compound, when compared at the same metallocene loading, e.g., there is substantially no precipitation of the mixture comprising cyclohexene, 1-hexene, and the metallocene compound at 0° C.

Embodiment 20

A process to produce a catalyst composition, the process comprising:
(i) contacting an activator-support and an organoaluminum compound for a first period of time to form a precontacted mixture; and (ii) contacting the precontacted mixture with a second mixture comprising cyclohexene and a metallocene compound for a second period of time to form the catalyst composition.

Embodiment 21

The process defined in embodiment 20, wherein the second mixture comprises cyclohexene, 1-hexene, and the metallocene compound.

Embodiment 22

The process defined in embodiment 21, wherein the weight ratio of 1-hexene to cyclohexene (1-hexene:cyclohexene) in the second mixture is in any range of weight ratios disclosed herein, e.g., from about 90:10 to about 20:80, from about 90:10 to about 50:50, or from about 85:15 to about 60:40.

Embodiment 23

The process defined in any one of embodiments 20-22, wherein the first period of time is any time period sufficient to form the precontacted mixture, e.g., from about 10 sec to about 48 hr, from about 30 sec to about 6 hr, at least about 5 sec, or at least about 1 min.

Embodiment 24

The process defined in any one of embodiments 20-23, wherein the second period of time is any time period sufficient to form the catalyst composition, e.g., from about 1 sec to about 48 hr, from about 30 sec to about 6 hr, at least about 5 sec, or at least about 1 min.

Embodiment 25

The process defined in any one of embodiments 20-24, wherein step (ii) comprises contacting the precontacted mixture, the second mixture, and an additional organoaluminum compound.

Embodiment 26

The process defined in any one of embodiments 20-25, wherein the activator-support is present as a slurry of the activator-support in a first diluent.

Embodiment 27

The process defined in embodiment 26, wherein the first diluent comprises any suitable non-polar hydrocarbon.

Embodiment 28

The process defined in embodiment 26, wherein the first diluent comprises propane, cyclohexane, isobutane, n-butane, n-pentane, isopentane, neopentane, n-hexane, or combinations thereof.

Embodiment 29

The process defined in embodiments 26, wherein the first diluent comprises cyclohexene, 1-hexene, or both.

Embodiment 30

The process defined in any one of embodiments 20-25, wherein the activator-support is present as a dry solid.

Embodiment 31

The process defined in any one of embodiments 20-30, wherein the mixture comprising cyclohexene and the metallocene compound (and 1-hexene, if used) is a solution, i.e., the metallocene compound is substantially dissolved at standard temperature and pressure.

Embodiment 32

The process defined in any one of embodiments 20-30, wherein the mixture comprising cyclohexene and the metallocene compound (and 1-hexene, if used) is a slurry, i.e., the metallocene compound is not dissolved at standard temperature and pressure.

Embodiment 33

The process defined in any one of embodiments 20-32, wherein the organoaluminum compound is present as a solution in any suitable hydrocarbon solvent.

Embodiment 34

The process defined in embodiment 33, wherein the hydrocarbon solvent comprises cyclohexane, isobutane, n-butane, n-pentane, isopentane, neopentane, hexane, heptane, or combinations thereof.

Embodiment 35

A catalyst composition produced by the process defined in any one of embodiments 20-34.

Embodiment 36

A catalyst composition comprising:
(I) a precontacted mixture comprising:
an activator-support, and
an organoaluminum compound;
(II) a metallocene compound; and
(III) cyclohexene.

Embodiment 37

A catalyst composition comprising:
(I) a precontacted mixture comprising:
an activator-support, and
an organoaluminum compound;
(II) a metallocene compound;
(III) cyclohexene; and
(IV) 1-hexene.

Embodiment 38

The process or composition defined in any one of embodiments 20-37, wherein an activity of the catalyst composition is greater (by any amount disclosed herein, e.g., at least about 1%, at least about 10%, at least about 25%, from about 1% to about 100%, or from about 5% to about 50%) than that of a catalyst system obtained by using toluene (or toluene and 1-hexene) instead of cyclohexene, under the same catalyst preparation and polymerization conditions.

Embodiment 39

The process or composition defined in any one of embodiments 21-37, wherein an activity of the catalyst composition is greater (by any amount disclosed herein, e.g., at least about 1%, at least about 10%, at least about 25%, from about 1% to about 100%, or from about 5% to about 50%) than that of a catalyst system obtained by using toluene and 1-hexene (or toluene) instead of cyclohexene and 1-hexene, under the same catalyst preparation and polymerization conditions.

Embodiment 40

The process or composition defined in any one of embodiments 20-39, wherein an activity of the catalyst composition is greater (by any amount disclosed herein, e.g., at least about 1%, at least about 10%, at least about 25%, from about 1% to about 100%, or from about 5% to about 50%) than that of a catalyst system obtained by first combining the activator-support and the second mixture, and then combining the organoaluminum compound, under the same polymerization conditions.

Embodiment 41

The process or composition defined in any one of embodiments 21-40, wherein the second mixture comprising cyclohexene, 1-hexene, and the metallocene compound has less precipitation of the metallocene compound and/or the metallocene compound precipitates at a lower temperature than that of a mixture containing toluene, 1-hexene, and the metallocene compound, when compared at the same metallocene loading, e.g., there is substantially no precipitation of the mixture comprising cyclohexene, 1-hexene, and the metallocene compound at 0° C.

Embodiment 42

The process or composition defined in any one of embodiments 1-41, wherein the activator-support comprises a solid oxide treated with an electron-withdrawing anion, for example, comprising any solid oxide treated with any electron-withdrawing anion disclosed herein.

Embodiment 43

The process or composition defined in embodiment 42, wherein the solid oxide comprises silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof and the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or any combination thereof.

Embodiment 44

The process or composition defined in any one of embodiments 1-41, wherein the activator-support comprises a fluorided solid oxide, a sulfated solid oxide, a phosphated solid oxide, or a combination thereof.

Embodiment 45

The process or composition defined in any one of embodiments 1-35, wherein the activator-support comprises fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Embodiment 46

The process or composition defined in any one of embodiments 1-41, wherein the activator-support comprises fluorided alumina, fluorided silica-alumina, fluorided silica-zirconia, fluorided silica-coated alumina, fluorided-chlorided silica-coated alumina, or any combination thereof (e.g., fluorided silica-coated alumina).

Embodiment 47

The process or composition defined in any one of embodiments 1-41, wherein the activator-support comprises sulfated alumina, sulfated silica-alumina, sulfated silica-coated alumina, or any combination thereof (e.g., sulfated alumina).

Embodiment 48

The process or composition defined in any one of embodiments 1-47, wherein the activator-support further comprises any metal or metal ion disclosed herein, e.g., zinc, nickel, vanadium, titanium, silver, copper, gallium, tin, tungsten, molybdenum, zirconium, or any combination thereof.

Embodiment 49

The process or composition defined in any one of embodiments 1-48, wherein the organoaluminum compound comprises any organoaluminum compound disclosed herein.

Embodiment 50

The process or composition defined in any one of embodiments 1-49, wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 51

The process or composition defined in embodiment 49 or 50, wherein the organoaluminum compound comprises triethylaluminum.

Embodiment 52

The process or composition defined in embodiment 49 or 50, wherein the organoaluminum compound comprises triisobutylaluminum.

Embodiment 53

The process or composition defined in any one of embodiments 1-52, wherein the catalyst composition is substantially free of aluminoxane compounds, organoboron or organoborate compounds, ionizing ionic compounds, or combinations thereof.

Embodiment 54

The process or composition defined in any one of embodiments 1-53, wherein the metallocene compound comprises a bridged metallocene compound, e.g., any bridged metallocene compound disclosed herein.

Embodiment 55

The process or composition defined in any one of embodiments 1-54, wherein the metallocene compound comprises a bridged zirconium based metallocene compound with a fluorenyl group, and with no aryl groups on the bridging group.

Embodiment 56

The process or composition defined in any one of embodiments 1-54, wherein the metallocene compound comprises a bridged zirconium based metallocene compound with a cyclopentadienyl group and a fluorenyl group, and with no aryl groups on the bridging group.

Embodiment 57

The process or composition defined in any one of embodiments 1-54, wherein the metallocene compound comprises a bridged zirconium or hafnium based metallocene compound with a fluorenyl group, and an aryl group on the bridging group.

Embodiment 58

The process or composition defined in any one of embodiments 1-54, wherein the metallocene compound comprises a bridged zirconium or hafnium based metallocene compound with a cyclopentadienyl group and fluorenyl group, and an aryl group on the bridging group.

Embodiment 59

The process or composition defined in any one of embodiments 1-54, wherein the metallocene compound comprises a bridged zirconium based metallocene compound with a fluorenyl group, and an aryl group on the bridging group.

Embodiment 60

The process or composition defined in any one of embodiments 1-54, wherein the metallocene compound comprises a bridged hafnium based metallocene compound with a fluorenyl group, and an aryl group on the bridging group.

Embodiment 61

The process or composition defined in any one of embodiments 57-60, wherein the aryl group is a phenyl group.

Embodiment 62

The process or composition defined in any one of embodiments 1-54, wherein the metallocene compound comprises a bridged zirconium or hafnium based metallocene compound with a cyclopentadienyl group and a fluorenyl group, and with an alkenyl substituent.

Embodiment 63

The process or composition defined in any one of embodiments 1-54, wherein the metallocene compound comprises a bridged zirconium or hafnium based metallocene compound with two indenyl groups.

Embodiment 64

The process or composition defined in any one of embodiments 1-54, wherein the metallocene compound comprises a bridged zirconium based metallocene compound with two indenyl groups.

Embodiment 65

The process or composition defined in any one of embodiments 63-64, wherein the bridging group contains a silicon atom.

Embodiment 66

The process or composition defined in any one of embodiments 1-53, wherein the metallocene compound comprises an unbridged metallocene compound, e.g., any unbridged metallocene compound disclosed herein.

Embodiment 67

The process or composition defined in any one of embodiments 1-53, wherein the metallocene compound comprises an unbridged zirconium or hafnium based metallocene compound containing two cyclopentadienyl groups, two indenyl groups, or a cyclopentadienyl and an indenyl group.

Embodiment 68

The process or composition defined in any one of embodiments 1-53, wherein the metallocene compound comprises an unbridged zirconium based metallocene compound containing two cyclopentadienyl groups, two indenyl groups, or a cyclopentadienyl and an indenyl group.

Embodiment 69

The process or composition defined in any one of embodiments 1-53, wherein the metallocene compound comprises an unbridged zirconium based homodinuclear metallocene compound.

Embodiment 70

The process or composition defined in any one of embodiments 1-53, wherein the metallocene compound comprises an unbridged hafnium based homodinuclear metallocene compound.

Embodiment 71

The process or composition defined in any one of embodiments 1-53, wherein the metallocene compound comprises an unbridged heterodinuclear metallocene compound.

Embodiment 72

The process or composition defined in any one of embodiments 1-71, wherein the weight ratio of the metallocene compound to the activator-support is in any range of weight ratios disclosed herein, e.g., from about 1:1 to about 1:1,000,000, from about 1:10 to about 1:10,000, or from about 1:20 to about 1:1000.

Embodiment 73

The process or composition defined in any one of embodiments 1-72, wherein the weight ratio of the activator-support to the organoaluminum compound is in any range of weight ratios disclosed herein, e.g., from about 1:5 to about 1000:1, from about 1:3 to about 200:1, or from about 1:1 to about 100:1.

Embodiment 74

An olefin polymerization process, the process comprising contacting the catalyst composition defined in any one of embodiments 1-73 with an olefin monomer and an optional olefin comonomer in a polymerization reactor system under polymerization conditions to produce an olefin polymer.

Embodiment 75

The process defined in embodiment 74, wherein the olefin monomer comprises any olefin monomer disclosed herein, e.g., any $C_2$-$C_{20}$ olefin.

Embodiment 76

The process defined in embodiment 74, wherein the olefin monomer and the optional olefin comonomer independently comprise a $C_2$-$C_{20}$ alpha-olefin.

Embodiment 77

The process defined in any one of embodiments 74-76, wherein the olefin monomer comprises ethylene.

Embodiment 78

The process defined in any one of embodiments 74-77, wherein the catalyst composition is contacted with ethylene and an olefin comonomer comprising a $C_3$-$C_{10}$ alpha-olefin.

Embodiment 79

The process defined in any one of embodiments 74-78, wherein the catalyst composition is contacted with ethylene and an olefin comonomer comprising 1-butene, 1-hexene, 1-octene, or a mixture thereof.

Embodiment 80

The process defined in any one of embodiments 74-76, wherein the olefin monomer comprises propylene.

Embodiment 81

The process defined in any one of embodiments 74-80, wherein the polymerization reactor system comprises a batch reactor, a slurry reactor, a gas-phase reactor, a solution reactor, a high pressure reactor, a tubular reactor, an autoclave reactor, or a combination thereof.

Embodiment 82

The process defined in any one of embodiments 74-81, wherein the polymerization reactor system comprises a slurry reactor, a gas-phase reactor, a solution reactor, or a combination thereof.

Embodiment 83

The process defined in any one of embodiments 74-82, wherein the polymerization reactor system comprises a loop slurry reactor.

Embodiment 84

The process defined in any one of embodiments 74-83, wherein the polymerization reactor system comprises a single reactor.

Embodiment 85

The process defined in any one of embodiments 74-83, wherein the polymerization reactor system comprises 2 reactors.

Embodiment 86

The process defined in any one of embodiments 74-83, wherein the polymerization reactor system comprises more than 2 reactors.

Embodiment 87

The process defined in any one of embodiments 74-86, wherein the olefin polymer comprises any olefin polymer disclosed herein.

Embodiment 88

The process defined in any one of embodiments 74-79 and 81-87, wherein the olefin polymer is an ethylene homopolymer, an ethylene/1-butene copolymer, an ethylene/1-hexene copolymer, or an ethylene/1-octene copolymer.

Embodiment 89

The process defined in any one of embodiments 74-79 and 81-88, wherein the olefin polymer is an ethylene/1-hexene copolymer.

Embodiment 90

The process defined in any one of embodiments 74-76 and 80-87, wherein the olefin polymer is a polypropylene homopolymer or a propylene-based copolymer.

Embodiment 91

An olefin polymer produced by the olefin polymerization process defined in any one of embodiments 74-90.

Embodiment 92

An olefin polymer produced by the olefin polymerization process defined in any one of embodiments 74-90, wherein the olefin polymer contains substantially no residual toluene, i.e., less than 5 ppm by weight.

Embodiment 93

An olefin polymer produced by the olefin polymerization process defined in any one of embodiments 74-90, wherein the olefin polymer contains lower levels of residual solvents than that of an olefin polymer obtained using a catalyst system prepared by using toluene (and 1-hexene, if used) instead of cyclohexene (and 1-hexene, if used), under the same catalyst preparation and polymerization conditions.

Embodiment 94

An article comprising the olefin polymer defined in any one of embodiments 91-93.

Embodiment 95

A method or forming or preparing an article of manufacture comprising an olefin polymer, the method comprising (i) performing the olefin polymerization process defined in any one of embodiments 74-90 to produce the olefin polymer, and (ii) forming the article of manufacture comprising the olefin polymer, e.g., via any technique disclosed herein.

Embodiment 96

The article defined in embodiment 94 or 95, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. A process to produce a catalyst composition, the process comprising:
   (i) contacting an activator-support and an organoaluminum compound for a first period of time to form a precontacted mixture; and
   (ii) contacting the precontacted mixture with a second mixture comprising cyclohexene and a metallocene compound for a second period of time to form the catalyst composition.

2. The process of claim 1, wherein:
   the first period of time is at least about 15 seconds; and
   an activity of the catalyst composition is greater than that of a catalyst system obtained by first combining the activator-support and the second mixture, and then combining the organoaluminum compound, under the same polymerization conditions.

3. The process of claim 1, wherein:
   the activator-support comprises a fluorided solid oxide, a sulfated solid oxide, a phosphated solid oxide, or a combination thereof; and
   the metallocene compound comprises a bridged zirconium or hafnium based metallocene compound with a cyclopentadienyl group and a fluorenyl group.

4. The process of claim 1, wherein an activity of the catalyst composition is greater than that of a catalyst system obtained by using toluene instead of cyclohexene in the second mixture, under the same catalyst preparation and polymerization conditions.

5. The process of claim 1, wherein:
   a slurry of the activator-support in a hydrocarbon diluent is contacted with the organoaluminum compound in step (i); and
   the second mixture comprising cyclohexene and the metallocene compound is a solution.

6. The process of claim 1, wherein the second mixture comprises cyclohexene, 1-hexene, and the metallocene compound.

7. The process of claim 6, wherein:
   a weight ratio of 1-hexene:cyclohexene in the second mixture is in a range from about 90:10 to about 20:80; and
   an activity of the catalyst composition is greater than that of a catalyst system obtained by using toluene and 1-hexene instead of cyclohexene and 1-hexene in the second mixture, under the same catalyst preparation and polymerization conditions.

8. A process to produce a catalyst composition, the process comprising contacting, in any order:
   (a) an activator-support;
   (b) a mixture comprising cyclohexene and a metallocene compound; and
   (c) an organoaluminum compound;
to produce the catalyst composition.

9. The process of claim 8, wherein:
   the activator-support comprises a fluorided solid oxide, a sulfated solid oxide, a phosphated solid oxide, or a combination thereof;
   the organoaluminum compound comprises trimethylaluminum, triethylaluminum, tri-n-propylaluminum, tri-n-butylaluminum, triisobutylaluminum, or any combination thereof; and
   the metallocene compound comprises an unbridged zirconium or hafnium based metallocene compound containing two cyclopentadienyl groups, two indenyl groups, or a cyclopentadienyl and an indenyl group.

10. The process of claim 8, wherein an activity of the catalyst composition is greater than that of a catalyst system obtained by using toluene instead of cyclohexene in the mixture, under the same catalyst preparation and polymerization conditions.

11. The process of claim 8, wherein the mixture comprises cyclohexene, 1-hexene, and the metallocene compound.

12. The process of claim 11, wherein:
   a weight ratio of 1-hexene:cyclohexene in the mixture is in a range from about 90:10 to about 50:50; and
   an activity of the catalyst composition is greater than that of a catalyst system obtained by using toluene and 1-hexene instead of cyclohexene and 1-hexene in the mixture, under the same catalyst preparation and polymerization conditions.

13. The process of claim 11, wherein the mixture comprising cyclohexene, 1-hexene, and the metallocene compound has less precipitation of the metallocene compound and/or the metallocene compound precipitates at a lower temperature than that of a mixture containing toluene, 1-hexene, and the metallocene compound, when compared at the same metallocene concentration and the same weight ratio of 1-hexene:cyclohexene.

* * * * *